United States Patent
Shiono et al.

(10) Patent No.: US 11,692,051 B2
(45) Date of Patent: Jul. 4, 2023

(54) METHOD FOR PRODUCING NITRILE GROUP-CONTAINING COPOLYMER RUBBER

(71) Applicant: ZEON CORPORATION, Tokyo (JP)

(72) Inventors: Atsuhiro Shiono, Tokyo (JP); Tomoyuki Shibuya, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 339 days.

(21) Appl. No.: 16/648,211

(22) PCT Filed: Sep. 19, 2018

(86) PCT No.: PCT/JP2018/034616
§ 371 (c)(1),
(2) Date: Mar. 17, 2020

(87) PCT Pub. No.: WO2019/065400
PCT Pub. Date: Apr. 4, 2019

(65) Prior Publication Data
US 2020/0216594 A1      Jul. 9, 2020

(30) Foreign Application Priority Data

Sep. 28, 2017    (JP) .................................. 2017-188217

(51) Int. Cl.
| | |
|---|---|
| *C08F 220/44* | (2006.01) |
| *C08F 2/22* | (2006.01) |
| *C08F 210/12* | (2006.01) |
| *C08F 210/14* | (2006.01) |

(52) U.S. Cl.
CPC .............. *C08F 220/44* (2013.01); *C08F 2/22* (2013.01); *C08F 210/12* (2013.01); *C08F 210/14* (2013.01)

(58) Field of Classification Search
CPC ........ C08F 220/44; C08F 2/22; C08F 210/12; C08F 210/14

USPC ......................................................... 524/812
See application file for complete search history.

(56) References Cited

U.S. PATENT DOCUMENTS

| | | | |
|---|---|---|---|
| 2008/0293868 A1 | 11/2008 | Obrecht | |
| 2018/0327517 A1* | 11/2018 | Mosaki | ............... C08L 13/00 |

FOREIGN PATENT DOCUMENTS

| | | | |
|---|---|---|---|
| JP | 05222267 A | * | 8/1993 |
| JP | H05-222267 A | | 8/1993 |
| JP | 2003-165814 A | | 6/2003 |
| JP | 2003165814 A | * | 6/2003 |
| JP | 2004-285263 A | | 10/2004 |
| JP | 2010-528140 A | | 8/2010 |
| WO | 2017/086358 A1 | | 5/2017 |

OTHER PUBLICATIONS

Dec. 18, 2018 International Search Report issued in International Patent Application No. PCT/JP2018/034616.
Mar. 31, 2020 International Preliminary Report on Patentability issued in International Patent Application No. PCT/JP2018/034616.
Jun. 14, 2021 Extended Search Report issued in European Patent Application No. 18860478.9.

\* cited by examiner

*Primary Examiner* — Kelechi C Egwim
(74) *Attorney, Agent, or Firm* — Oliff PLC

(57) ABSTRACT

A method for producing a nitrile group-containing copolymer rubber including copolymerizing a monomer mixture containing an α,β-ethylenically unsaturated nitrile monomer and a conjugated diene monomer, in which the copolymer has a Mooney viscosity (ML1+4, 100° C.) in a range of 30 to 60 at a time point when a polymerization conversion rate is 60%, the copolymerization is carried out until the polymerization conversion rate reaches 85% or more, and the obtained nitrile group-containing copolymer rubber has a Mooney viscosity (ML1+4, 100° C.) of 85 to 150.

4 Claims, No Drawings

METHOD FOR PRODUCING NITRILE GROUP-CONTAINING COPOLYMER RUBBER

TECHNICAL FIELD

The present invention relates to a method for producing a nitrile group-containing copolymer rubber, and more particularly to a method for producing a nitrile group-containing copolymer rubber which provides a crosslinkable rubber composition having excellent shape retention.

BACKGROUND ART

Conventionally, rubbers containing α,β-ethylenically unsaturated nitrile monomer units and conjugated diene monomer units (nitrile group-containing copolymer rubber) are known as rubbers having excellent oil resistance. The vulcanized product thereof is used as a material for rubber products around various oils for industrial and automobile uses such as hoses, belts, gaskets, packings, seals, and rolls.

As a method for producing such a nitrile group-containing copolymer rubber, for example, Patent Document 1 discloses a method for producing a nitrile group-containing conjugated diene rubber comprising radically polymerizing a monomer mixture containing an α,β-ethylenically unsaturated nitrile monomer and a conjugated diene monomer using a compound having 3 or more tertiary carbon atoms and having an alkylthio group having 12 to 16 carbon atoms in which a sulfur atom is directly bonded to at least one of the tertiary carbon atoms as a molecular weight adjuster, wherein the radical polymerization is continued even after a residual amount of the molecular weight adjuster relative to the entire polymerization reaction solution has decreased to 200 ppm. However, the nitrile group-containing conjugated diene rubber obtained by the technique of Patent Document 1 does not have sufficient shape retention when made into a crosslinkable rubber composition, and therefore, further improvement in shape retention has been demanded.

RELATED ART

Patent Documents

Patent Document 1: Japanese Patent Laid-Open No. 2004-285263

SUMMARY OF THE INVENTION

Problem to be Solved by the Invention

The present invention has been made in view of such circumstances, and an object thereof is to provide a method for producing a nitrile group-containing copolymer rubber which provides a crosslinkable rubber composition having excellent shape retention. Another object of the present invention is to provide a method for producing a crosslinkable rubber composition having excellent shape retention, which contains a nitrile group-containing copolymer rubber obtained by such a production method.

Means for Solving the Problem

The present inventors have conducted intensive studies to achieve the above object, and as a result, the present inventors have found that by copolymerizing a monomer mixture containing an α,β-ethylenically unsaturated nitrile monomer and a conjugated diene monomer while adjusting the polymerization conversion rate and Mooney viscosity, a nitrile group-containing copolymer rubber having excellent shape retention when made into a crosslinkable rubber composition can be obtained, thereby completing the present invention.

That is, the present invention provides a method for producing a nitrile group-containing copolymer rubber including copolymerizing a monomer mixture containing an α,β-ethylenically unsaturated nitrile monomer and a conjugated diene monomer, in which the copolymer has a Mooney viscosity (ML1+4, 100° C.) in a range of 30 to 60 at a time point when a polymerization conversion rate is 60%, the copolymerization is carried out until the polymerization conversion rate reaches 85% or more, and the obtained nitrile group-containing copolymer rubber has a Mooney viscosity (ML1+4, 100° C.) of 85 to 150.

In the production method according to the present invention, it is preferable that a method for the copolymerization be an emulsion polymerization method, and the temperature of the emulsion polymerization be 0 to 70° C.

In the production method according to the present invention, it is preferable that in the copolymerization, a molecular weight adjuster be added at an early stage of the copolymerization, and a molecular weight adjuster be not added thereafter.

In the production method according to the present invention, it is preferable that an amount of the molecular weight adjuster used be 0.29 to 0.5 parts by weight relative to 100 parts by weight of the monomer mixture.

According to the production method according to the present invention, a method for producing a nitrile group-containing copolymer rubber including hydrogenating at least some of carbon-carbon unsaturated bonds of the nitrile group-containing copolymer rubber having a Mooney viscosity (ML1+4, 100° C.) of 85 to 150 obtainable by the above production methods is provided.

According to the present invention, a method for producing a crosslinkable rubber composition including adding a crosslinking agent to the nitrile group-containing copolymer rubber obtainable by the above production methods is also provided.

According to the present invention, a method for producing a crosslinked rubber, including crosslinking the crosslinkable rubber composition obtainable by the above production method is further provided.

Effects of Invention

According to the present invention, it is possible to provide a method for producing a nitrile group-containing copolymer rubber which provides a crosslinkable rubber composition having excellent shape retention. Also, according to the present invention, it is possible to provide a method for producing a crosslinkable rubber composition having excellent shape retention, which contains a nitrile group-containing copolymer rubber obtained by such a production method.

DESCRIPTION OF EMBODIMENTS

<Method for Producing Nitrile Group-Containing Copolymer Rubber>

The method for producing a nitrile group-containing copolymer rubber according to the present invention includes copolymerizing a monomer mixture containing an α,β-ethylenically unsaturated nitrile monomer and a conjugated diene monomer, in which the copolymer has a Mooney viscosity (ML1+4, 100° C.) in a range of 30 to 60 at a time point when a polymerization conversion rate is 60%, the copolymerization is carried out until the polymerization conversion rate reaches 85% or more, and the obtained nitrile group-containing copolymer rubber has a Mooney viscosity (ML1+4, 100° C.) of 85 to 150.

The α,β-ethylenically unsaturated nitrile monomer is not particularly limited, and an ethylenically unsaturated compound having a nitrile group and preferably having 3 to 18 carbon atoms can be used. Examples of such α,β-ethylenically unsaturated nitrile monomer include acrylonitrile; α-halogenoacrylonitriles such as α-chloroacrylonitrile and α-bromoacrylonitrile; α-alkylacrylonitriles such as methacrylonitrile and ethacrylonitrile; and the like. Among these, preferred are acrylonitrile and methacrylonitrile, and particularly preferred is acrylonitrile. These α,β-ethylenically unsaturated nitrile monomers may be used alone or in combination of two or more.

The amount of the α,β-ethylenically unsaturated nitrile monomer used in the monomer mixture used in the production method according to the present invention may be appropriately determined according to the composition of the finally obtained nitrile group-containing copolymer rubber, and the amount is preferably 10 to 60 wt %, more preferably 15 to 55 wt %, and particularly preferably 20 to 50 wt %. An amount of the α,β-ethylenically unsaturated nitrile monomer to be used within this range results in a nitrile group-containing copolymer rubber having excellent oil resistance and cold resistance.

Preferred conjugated diene monomers are conjugated diene monomers having 4 to 6 carbon atoms such as 1,3-butadiene, isoprene, 2,3-dimethyl-1,3-butadiene, 1,3-pentadiene, and chloroprene. 1,3-Butadiene and isoprene are more preferred, and 1,3-butadiene is particularly preferred. These conjugated diene monomers may be used alone or in combination of two or more.

The amount of the conjugated diene monomer used in the monomer mixture used in the production method according to the present invention may be appropriately determined according to the composition of the finally obtained nitrile group-containing copolymer rubber, and the amount is preferably 40 to 90 wt %, more preferably 45 to 85 wt %, and particularly preferably 50 to 80 wt %. A content of the conjugated diene monomer unit within this range results in a nitrile group-containing copolymer rubber maintaining favorable rubber elasticity and having excellent oil resistance, heat aging resistance, and chemical stability.

The monomer mixture used in the production method according to the present invention may contain, in addition to the above-described α,β-ethylenically unsaturated nitrile monomer and the conjugated diene monomer, another monomer copolymerizable with these monomers.

Examples of such other monomers include α-olefin monomers, non-conjugated diene monomers, aromatic vinyl monomers, α,β-ethylenically unsaturated monocarboxylic acids and esters thereof, and α,β-ethylenically unsaturated polycarboxylic acids and their monoesters, polyfunctional esters and anhydrides thereof, crosslinkable monomers, fluorine-containing vinyl monomers, copolymerizable antioxidants, and the like.

Preferred α-olefin monomers are those having 2 to 12 carbon atoms. Examples thereof include ethylene, propylene, 1-butene, 4-methyl-1-pentene, 1-hexene, 1-octene, and the like.

Preferred non-conjugated diene monomers are those having 5 to 12 carbon atoms, and examples thereof include 1,4-pentadiene, 1,4-hexadiene, vinylnorbornene, dicyclopentadiene, and the like.

Examples of the aromatic vinyl monomers include styrene, α-methylstyrene, vinylpyridine, and the like.

Preferred examples of the α,β-ethylenically unsaturated monocarboxylic acids include acrylic acid, methacrylic acid, crotonic acid, cinnamic acid, and the like.

Examples of α,β-ethylenically unsaturated monocarboxylic acid esters include (meth)acrylic acid esters (abbreviation for "methacrylic acid esters and acrylic acid esters" and the same applies hereinafter) having an alkyl group having 1 to 18 carbon atoms, such as methyl acrylate, ethyl acrylate, n-butyl acrylate, isobutyl acrylate, n-dodecyl acrylate, methyl methacrylate, and ethyl methacrylate; (meth)acrylic acid esters having an alkoxyalkyl group having 2 to 18 carbon atoms, such as methoxymethyl acrylate, methoxyethyl acrylate, ethoxypropyl acrylate, methoxybutyl acrylate, ethoxydodecyl acrylate, methoxyethyl methacrylate, methoxybutyl methacrylate, and ethoxypentyl methacrylate; (meth)acrylic acid esters having a cyanoalkyl group having 2 to 12 carbon atoms, such as α-cyanoethyl acrylate, α-cyanoethyl methacrylate, and cyanobutyl methacrylate; (meth) acrylic acid esters having a hydroxyalkyl group having 1 to 12 carbon atoms, such as 2-hydroxyethyl acrylate, 2-hydroxypropyl acrylate, and 2-hydroxyethyl methacrylate; (meth)acrylic acid esters having a fluoroalkyl group having 1 to 12 carbon atoms, such as trifluoroethyl acrylate and tetrafluoropropyl methacrylate; and the like.

Examples of the α,β-ethylenically unsaturated polycarboxylic acids include maleic acid, fumaric acid, itaconic acid, and the like.

Examples of the α,β-ethylenically unsaturated polycarboxylic acid monoesters include maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkylcycloalkyl esters such as monomethylcyclopentyl maleate and monoethylcyclohexyl maleate; fumaric acid monoalkyl esters such as monomethyl fumarate, monoethyl fumarate, monopropyl fumarate, and mono n-butyl fumarate; fumaric acid monocycloalkyl esters such as monocyclopentyl fumarate, monocyclohexyl fumarate, monocycloheptyl fumarate; fumaric acid monoalkylcycloalkyl esters such as monomethylcyclopentyl fumarate and monoethylcyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkylcycloalkyl esters such as monomethylcyclopentyl citraconate and monoethylcyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkylcycloalkyl esters such as monomethylcyclopentyl itaconate and monoethylcyclohexyl itaconate; and the like.

Examples of the α,β-ethylenically unsaturated polycarboxylic acid polyester include dimethyl maleate, di-n-butyl maleate, dimethyl fumarate, di-n-butyl fumarate, dimethyl itaconate, di-n-butyl itaconate, and the like.

Examples of the α,β-ethylenically unsaturated polycarboxylic anhydrides include maleic anhydride, itaconic anhydride, and the like.

Examples of the crosslinkable monomers include polyfunctional ethylenically unsaturated monomers such as: divinyl compounds such as divinylbenzene; di(meth)acrylates such as ethylene di(meth)acrylate, diethylene glycol di(meth)acrylate, and polyethylene glycol di(meth)acrylate; and trimethacrylates such as trimethylolpropane tri(meth)acrylate; self-crosslinkable monomers such as N-methylol (meth)acrylamide and N,N☐-dimethylol (meth)acrylamide; and the like.

Examples of the fluorine-containing vinyl monomers include fluoroethyl vinyl ether, fluoropropyl vinyl ether, o-trifluoromethylstyrene, pentafluorovinyl benzoate, difluoroethylene, tetrafluoroethylene, and the like.

Examples of the copolymerizable antioxidants include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy) aniline, N-phenyl-4-(4-vinylbenzyloxy)aniline, and the like.

As these other copolymerizable monomers, a plurality of monomers may be used in combination.

Although the amount of the other copolymerizable monomer used in the monomer mixture used in the production method according to the present invention may be appropriately determined according to the composition of the finally obtained nitrile group-containing copolymer rubber, the amount is preferably 50 wt % or less, more preferably 30 wt % or less, and particularly preferably 10 wt % or less.

In the production method according to the present invention, the nitrile group-containing copolymer rubber is obtained by copolymerizing a monomer mixture containing an α,β-ethylenically unsaturated nitrile monomer and a conjugated diene monomer. In the production method according to the present invention, at this time, the copolymerization is carried out such that the copolymer has a Mooney viscosity (ML1+4, 100° C.) of 30 to 60 at the time point when the polymerization conversion rate is 60%, the copolymerization is further continued until the polymerization conversion rate reaches 85% or more, and the finally obtained nitrile group-containing copolymer rubber has a Mooney viscosity (ML1+4, 100° C.) in the range of 85 to 150. In the present invention, by adjusting the polymerization conversion rate and the Mooney viscosity to fall into the above ranges, a nitrile group-containing copolymer rubber having excellent shape retention when made into a crosslinkable rubber composition can be manufactured.

The polymerization conversion rate can be obtained by dividing a value obtained by subtracting the weight of the unreacted monomer mixture from the total weight of the monomer mixture used in the polymerization by the total weight of the monomer mixture used in the polymerization, or alternatively, can be obtained by dividing the weight of the polymer itself by the total weight of the monomer mixture used in the polymerization. Here, the "value obtained by subtracting the weight of the unreacted monomer mixture from the total weight of the monomer mixture used in the polymerization" corresponds to the weight of the monomer mixture converted into the polymer by the polymerization reaction, that is, the weight of the polymer itself, and the weight of the polymer itself corresponds to the corrected total solid content obtained by subtracting the total solid content of the auxiliary materials (sodium salt of emulsifier, sodium sulfate, molecular weight adjuster, polymerization initiator, and polymerization terminator) used in the polymerization from the total solid content in the polymerization reaction solution. Auxiliary materials other than the above-mentioned auxiliary materials having negligible effects on the calculation are not taken into consideration. Accordingly, the polymerization conversion rate can be obtained by obtaining the total solid content by drying the polymerization reaction solution under high heat as the "corrected total solid content (total solid content−polymerization auxiliary material solid content)/total weight of monomer mixture used in polymerization".

The Mooney viscosities (ML1+4, 100° C.) of the copolymer at the time point when the polymerization conversion rate is 60% and the finally obtained nitrile group-containing copolymer rubber are measured in accordance with JIS K 6300.

The Mooney viscosity (ML1+4, 100° C.) of the copolymer at the time point when the polymerization conversion rate is 60% is 30 to 60, preferably 35 to 55, and more preferably 35 to 50. When the Mooney viscosity of the copolymer at the time point when the polymerization conversion rate is 60% is too high, a nitrile group-containing copolymer rubber which provides a crosslinkable rubber composition having excellent shape retention cannot be obtained. Also, when the Mooney viscosity of the copolymer at the time point when the polymerization conversion rate is 60% is too low, a sufficiently high Mooney viscosity of the finally obtained nitrile group-containing copolymer rubber is not obtained, and thus a nitrile group-containing copolymer rubber which provides a crosslinkable rubber composition having excellent shape retention cannot be obtained.

The Mooney viscosity (ML1+4, 100° C.) of the finally obtained nitrile group-containing copolymer rubber is 85 to 150, preferably 85 to 120, and more preferably 85 to 100. When the Mooney viscosity of the finally obtained nitrile group-containing copolymer rubber is too high, the Mooney viscosity of the crosslinkable rubber composition also increases, and the processability of the crosslinkable rubber composition thus obtained deteriorates. Also, when the Mooney viscosity of the finally obtained nitrile group-containing copolymer rubber is too low, a nitrile group-containing copolymer rubber which provides a crosslinkable rubber composition having excellent shape retention cannot be obtained.

The polymerization conversion rate at the time point when the polymerization is completed is 85% or more, preferably 85 to 98%, and more preferably 88 to 96%. When the polymerization conversion rate at the time point when the polymerization is completed is too low, a sufficiently high Mooney viscosity of the finally obtained nitrile group-containing copolymer rubber is not obtained, and thus a nitrile group-containing copolymer rubber which provides a crosslinkable rubber composition having excellent shape retention cannot be obtained. When the polymerization conversion rate at the time point when the polymerization is completed is too high, the productivity of the polymerization step may be reduced due to a longer reaction time, or the productivity in the polymerization step and the processing step may be decreased due to an increase in the Mooney viscosity, which makes it difficult to handle the nitrile group-containing copolymer rubber in the producing step and processing step.

The method to adjust the Mooney viscosities of the copolymer at the time point when the polymerization conversion rate is 60% and the finally obtained nitrile group-containing copolymer rubber to fall into the above ranges is not particularly limited. Examples thereof include a method of adjusting a timing and amount of the molecular weight adjuster added when copolymerizing a monomer mixture, a method of adjusting a polymerization conversion rate at a time point when a polymerization is completed, a method of adding a molecular weight adjuster which has been previously emulsified with an emulsifier, a method of adjusting a type and amount of the emulsifier, and the like. An example thereof is a method in which a relatively large amount of a molecular weight adjuster is added at an early stage of copolymerization, preferably at the start of copolymerization, and the molecular weight adjuster is not added thereafter, and a polymerization conversion rate at a time point when the polymerization is completed is set relatively high. It is presumed that according to such a method, a large number of molecular chains having a low molecular weight are generated in the early to middle stages of the copolymerization (for example, at a polymerization conversion rate of about 60%), and the generation of high molecular weight molecular chains and the reaction of bonding between molecular chains proceed preferentially in the later stage of the copolymerization as the molecular weight adjuster is consumed, and using the polymer obtained thereby, which contains a relatively large number of branched structures, a nitrile group-containing copolymer rubber which provides a crosslinkable rubber composition having excellent shape retention can thus be obtained.

The copolymerization method is not particularly limited, and an emulsion polymerization method is preferred from the viewpoint of industrial productivity. In emulsion polymerization, polymerization auxiliary materials usually used can be used in addition to an emulsifier, a polymerization initiator, and a molecular weight adjuster.

The emulsifier is not particularly limited. Examples thereof include nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, stearic acid, oleic acid, and linolenic acid, salts of alkylbenzene sulfonates such as sodium dodecylbenzenesulfonate, polycondensates of naphthalene sulfonate salts with formalin, higher alcohol sulfuric acid ester salts, and alkyl sulfosuccinate salts; copolymerizable emulsifiers such as sulfo esters of α,β-unsaturated carboxylic acids, sulfate esters of α,β-unsaturated carboxylic acids, and sulfoalkylaryl ethers; and the like. These emulsifiers can be used alone or in combination of two or more. Among them, salts of fatty acids, alkylbenzene sulfonate salts and polycondensates of naphthalene sulfonate salts with formalin are preferred, and alkylbenzene sulfonate salts and polycondensates of naphthalene sulfonate salts with formalin are particularly preferred. The amount of the emulsifier to be added is preferably 0.1 to 10 parts by weight, more preferably 0.5 to 5 parts by weight, and particularly preferably 2 to 4 parts by mass relative to 100 parts by weight of the monomer mixture used in polymerization.

The polymerization initiator is not particularly limited as long as it is a radical initiator. Examples thereof include inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexanecarbonitrile, and methyl azobisisobutyrate; and the like. These polymerization initiators can be used alone or in combination of two or more. Preferred polymerization initiators are inorganic or organic peroxides. In a case where a peroxide is used as the polymerization initiator, a combination thereof with a reducing agent such as sodium bisulfite, ferrous sulfate, sodium formaldehyde sulfoxylate, or ethylenediaminetetraacetic acid ferric sodium salt can be used as a redox polymerization initiator. Furthermore, a chelating agent such as ethylenediaminetetraacetic acid ferric sodium salt tetrahydrate, and a builder such as sodium carbonate or sodium sulfate can also be used. The amount of the polymerization initiator to be added is preferably 0.01 to 2 parts by weight, more preferably 0.01 to 0.5 parts by weight, and particularly preferably 0.02 to 0.05 parts by weight relative to 100 parts by weight of the monomer mixture used in the polymerization.

The molecular weight adjuster is not particularly limited. Examples thereof include mercaptans such as t-dodecyl mercaptan, n-dodecyl mercaptan, and octyl mercaptan; halogenated hydrocarbons such as carbon tetrachloride, methylene chloride, and methylene bromide; α-methylstyrene dimers; sulfur-containing compounds such as tetraethylthiuram disulfide, dipentamethylenethiuram disulfide, and diisopropyl xanthogen disulfide; and the like. These molecular weight adjusters can be used alone or in combination of two or more. Among these, preferred are mercaptans, and more preferred is t-dodecyl mercaptan. The amount of the molecular weight adjuster to be used is preferably 0.1 to 0.8 parts by weight, more preferably 0.2 to 0.6 parts by weight, particularly preferably 0.3 to 0.4 parts by weight relative to 100 parts by weight of the monomer mixture. In a case where the method in which a reatively large amount of the molecular weight adjuster is added at an early stage of the copolymerization, preferably at the start of the copolymerization, and the molecular weight adjuster is not added thereafter is adopted, the amount of the molecular weight adjuster to be used is preferably 0.29 to 0.50 parts by weight, more preferably 0.30 to 0.45 parts by weight, and particularly preferably 0.30 to 0.40 parts by weight, relative to 100 parts by weight of the monomer mixture.

Water is usually used as the medium for emulsion polymerization. The amount of water is preferably 80 to 500 parts by weight, more preferably 80 to 300 parts by weight relative to 100 parts by weight of the monomers used in polymerization.

In emulsion polymerization, polymerization auxiliary materials such as a stabilizer, a dispersant, a pH adjuster, an oxygen absorbing agent, and a particle size adjuster can be used as needed. When the auxiliary materials are used, their type or amount is not particularly limited.

Further, the obtained nitrile group-containing copolymer rubber may be subjected to hydrogenation (hydrogenation reaction) of the nitrile group-containing copolymer rubber, as needed. The method for producing a nitrile group-containing copolymer rubber according to the present invention may also be a method including hydrogenating at least some of carbon-carbon unsaturated bonds of the nitrile group-containing copolymer rubber having a Mooney viscosity (ML1+4, 100° C.) of 85 to 150 obtainable by the above production methods. In this case, the method of hydrogenation is not particularly limited, and a known method may be employed. The hydrogenated nitrile group-containing copolymer rubber has an iodine value of preferably 120 or less, more preferably 80 or less, further preferably 60 or less, particularly preferably 30 or less. Hydrogenating the nitrile group-containing copolymer rubber results in improvement in heat resistance, weather resistance, ozone resistance, and the like. The iodine value can be measured in accordance with JIS K 6235.

The temperature of the emulsion polymerization is preferably 0 to 70° C., more preferably 5 to 30° C., and particularly preferably 5 to 15° C.

Emulsion polymerization of the monomer mixture is performed as described above, and at the time point when the above polymerization conversion rate is reached, the polymerization reaction is terminated by adding a polymerization terminator, introducing air or oxygen, or cooling the polymerization system.

The polymerization terminator is not particularly limited. Examples thereof include hydroxylamine, hydroxyamine sulfate, diethylhydroxylamine, hydroxyaminesulfonic acid and alkali metal salts thereof, sodium dimethyldithiocarbamate, hydroquinone and hydroquinone derivatives such as 2,5-di-tert-amylhydroquinone, nitrites such as potassium nitrite and sodium nitrite, catechol derivatives, aromatic hydroxydithiocarboxylic acids such as hydroxydimethylbenzenethiocarboxylic acid, hydroxydiethylbenzenedithiocarboxylic acid, hydroxydibutylbenzenedithiocarboxylic acid, and alkali metal salts thereof, compounds containing stable free radicals such as 2,2,6,6-tetramethylpiperidine-1-oxyl, and the like. The amount of the molecular polymerization terminator to be used is preferably 0.01 to 2 parts by weight relative to 100 parts by weight of the monomer mixture.

The nitrile group-containing copolymer rubber according to the present invention can be produced by performing coagulation with an alcohol such as methanol and isopropyl alcohol or by salting-out, washing with water, and filtration on the resulting polymerization reaction solution, and then drying the resulting hydrated crumb. Coagulation by salting-out can be performed using a known coagulant such as sodium chloride, calcium chloride, aluminum sulfate, or magnesium sulfate. Centrifugal dehydration may be performed in some cases.

An antioxidant can also be added to the polymerization reaction solution before coagulation. The antioxidant is not particularly limited. Examples of usable antioxidants include 2,6-di-t-butyl-4-cresol (ANTAGE BHT, manufactured by Kawaguchi Chemical Industry Co., Ltd.), 2,2□-methylenebis(4-methyl-6-tert-butylphenol) (Sandant 2246, manufactured by Sanshin Chemical Industry Co., Ltd.), bis(3,5-di-tert-butyl-4-hydroxybenzyl)sulfide (Sandant 103, manufactured by Sanshin Chemical Industry Co., Ltd.), pentaerythritol tetrakis[3-(3,5-di-tert-butyl-4-hydroxyphenyl)propionate] (Irganox 1010, manufactured by BASF SE Japan Ltd.), octadecyl 3-(3,5-di-tert-butyl-4-hydroxyphenyl)propionate (Irganox 1076, manufactured by BASF SE Japan Ltd.), isooctyl-3-(3,5-di-tert-butyl-4-hydroxyphenyl) propionate (Irganox 1135, manufactured by BASF SE Japan Ltd.), hexamethylenebis[3-(3,5-di-tert-butyl-4-hydroxyphenyl)propionate] (Irganox 259, manufactured by BASF SE Japan Ltd.), 4,6-bis(octylthiomethyl)-o-cresol (Irganox 1520L, manufactured by BASF SE Japan Ltd.), and the like.

<Crosslinkable Rubber Composition>

A crosslinkable rubber composition according to the present invention is obtained by adding a crosslinking agent to the nitrile group-containing copolymer rubber obtainable by the above-described production method of the present invention. Since the crosslinkable rubber composition according to the present invention uses the nitrile group-containing copolymer rubber obtainable by the above-described production method according to the present invention, the crosslinkable rubber composition has excellent shape retention and thus it is possible to suppress deformation of the molded article of the crosslinkable rubber composition before crosslinking. The crosslinking agent is not particularly limited. Examples thereof include a sulfur-containing crosslinking agent and an organic peroxide crosslinking agent. When the nitrile group-containing copolymer rubber has a monomer unit having a carboxyl group, a polyamine crosslinking agent can also be used.

Examples of the sulfur-containing crosslinking agent include sulfur such as powdered sulfur, sublime sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N□-dithio-bis(hexahydro-2H-azenopin-2), and phosphorus-containing polysulfide, polymer polysulfide; sulfur-donor compounds such as tetramethyl thiuram disulfide, selenium dimethyl dithiocarbamate, and 2-(4□-morpholinodithio) benzothiazole; and the like. These can be used alone or in combination of two or more thereof.

Examples of the organic peroxide crosslinking agent include dicumyl peroxide, cumene hydroperoxide, t-butyl-cumyl peroxide, paramenthane hydroperoxide, di-t-butyl peroxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butyl-valerate, 2,5-dimethyl-2,5-di-t-butylperoxyhexane, 2,5-dimethyl-2,5-di-t-butylperoxyhexyne-3,1,1-di-t-butylperoxy-3,5,5-trimethylcyclohexane, p-chlorobenzoyl peroxide, t-butylperoxy isopropyl carbonate, t-butyl peroxy benzoate, and the like. These can be used alone or in combination of two or more thereof.

The polyamine crosslinking agent may be any compound as long as it is a compound having two or more amino groups or a compound which is converted into a compound having two or more amino groups during crosslinking. Preferred are compounds in which a plurality of hydrogen atoms in an aliphatic hydrocarbon or aromatic hydrocarbon moiety are replaced with amino groups or hydrazide structures (the structures represented by —CONHNH$_2$ where CO represents a carbonyl group) and compounds which are converted into such compounds upon crosslinking. Specific examples thereof include aliphatic polyamines such as hexamethylenediamine, hexamethylenediamine carbamate, tetramethylenepentamine, hexamethylenediamine cinnamaldehyde adducts, and hexamethylenediamine dibenzoate salt; aromatic polyamines such as 2,2-bis[4-(4-aminophenoxy)phenyl]propane, 4,4□-methylenedianiline, m-phenylenediamine, p-phenylenediamine, and 4,4⌐-methylenebis(o-chloroaniline); compounds having two or more hydrazide structures, such as isophthalic dihydrazide, adipic dihydrazide, and sebacic dihydrazide; and the like. These can be used alone or in combination of two or more thereof.

The content of the crosslinking agent in the crosslinkable rubber composition according to the present invention is not particularly limited, and the content is preferably 0.1 to 10 parts by weight, more preferably 0.2 to 5 parts by weight relative to 100 parts by weight of the nitrile group-containing copolymer rubber.

In a case where the sulfur-containing crosslinking agent is used as the crosslinking agent, it is preferable to use zinc white, a guanidine crosslinking accelerator, a thiazole crosslinking accelerator, a thiuram crosslinking accelerator, a dithiocarbamate crosslinking accelerator, or the like in combination therewith as a crosslinking aid.

In a case where the organic peroxide crosslinking agent is used as the crosslinking agent, it is preferable to use triallyl cyanurate, trimethylolpropane trimethacrylate, N,N□-m-phenylenebismaleimide, or the like in combination therewith as a crosslinking aid.

In a case where the polyamine crosslinking agent is used as the crosslinking agent, it is preferable to use compounds represented by the following general formula (1), basic crosslinking accelerators having a cyclic amidine structure, basic guanidine crosslinking accelerators, basic aldehyde amine crosslinking accelerators, or the like in combination therewith as a crosslinking aid.

$$R^1-NH-R^2 \tag{1}$$

(where $R^1$ and $R^2$ each independently represent an alkyl group having 1 to 12 carbon atoms which may have a substituent or a cycloalkyl group having 5 to 12 carbon atoms which may have a substituent).

The crosslinking aid may be used alone, may be used in combination of two or more thereof, or may be dispersed in clay, calcium carbonate, silica, or the like and used in order to improve processability of the rubber composition. The amount of the crosslinking aid used is not particularly limited, and the amount thereof may be determined according to the application of the crosslinked rubber, the required performance, the kind of the crosslinking agent, the kind of the crosslinking aid, or the like.

In addition to the nitrile group-containing copolymer rubber and the crosslinking agent, the crosslinkable rubber composition according to the present invention can also be compounded with compounding agents usually used in the rubber field: for example, reinforcing agents such as carbon black and silica, fillers such as calcium carbonate, talc, and clay, metal oxides such as zinc oxide and magnesium oxide, $\alpha,\beta$-ethylenically unsaturated carboxylic acid metal salts such as zinc methacrylate and zinc acrylate, co-crosslinking agents, crosslinking aids, crosslinking retarders, antioxidants, light stabilizers, scorching preventing agents such as primary amines, activating agents such as diethylene glycol, coupling agents, plasticizers, processing aids, lubricants, adhesives, lubricants, flame retardants, antifungal agents, acid acceptors, antistatic agents, pigments, and foaming agents. The amounts of these compounding agents are not particularly limited as long as the amounts are in the range not impairing the purpose or effects of the present invention, and they can be compounded in the compounding amounts according to the purpose of compounding. The compounding amount of the reinforcing agent such as carbon black is preferably 1 to 200 parts by weight, more preferably 15 to 150 parts by weight, and still more preferably 30 to 100 parts by weight relative to 100 parts by weight of the nitrile group-containing copolymer rubber.

Examples of carbon black include furnace black, acetylene black, thermal black, channel black, austin black, graphite, and the like. These can be used alone or in combination of two or more thereof.

Examples of silica include natural silicas such as quartz powder and silica stone powder; synthetic silicas such as silicic anhydride (such as silica gel and aerosil) and hydrous silicic acid; and the like. Among these, preferred are synthetic silicas. These silicas may be surface-treated with a coupling agent or the like.

The plasticizer is not particularly limited. Examples thereof include trimellitic acid plasticizers, pyromellitic acid plasticizers, ether ester plasticizers, polyester plasticizers, phthalic acid plasticizers, adipic acid ester plasticizers, phosphoric acid ester plasticizers, sebacic acid ester plasticizers, alkylsulfonic acid ester compound plasticizers, epoxidated vegetable oil plasticizers, and the like. Specific examples thereof include tri-2-ethylhexyl trimellitate, trimellitic acid isonyl ester, trimellitic acid mixed linear alkyl esters, dipentaerythritol esters, pyromellitic acid 2-ethylhexyl ester, polyether esters (molecular weight: about 300 to 5000), bis[2-(2-butoxyethoxy)ethyl]adipate, dioctyl adipate, adipic acid polyester (molecular weight: about 300 to 5000), dioctyl phthalate, diisononyl phthalate, dibutyl phthalate, tricresyl phosphate, dibutyl sebacate, alkylsulfonic acid phenyl ester, epoxidized soybean oil, diheptanoate, di-2-ethylhexanoate, didecanoate, and the like. These can be used alone or in combination of two or more thereof.

In the crosslinkable rubber composition according to the present invention, a rubber other than the nitrile group-containing copolymer rubber may be compounded.

Examples of such a rubber include acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, fluorocarbon rubber, urethane rubber, chloroprene rubber, silicone rubber, natural rubber, polyisoprene rubber, and the like.

In a case where the rubber other than the nitrile group-containing copolymer rubber is compounded, the compounding amount in the crosslinkable rubber composition is preferably 30 parts by weight or less, more preferably 20 parts by weight or less, still more preferably 10 parts by weight or less relative to 100 parts by weight of the nitrile group-containing copolymer rubber.

The crosslinkable rubber composition according to the present invention is prepared by mixing the components above preferably in a nonaqueous system. The method for preparing the crosslinkable rubber composition according to the present invention is not limited. The crosslinkable rubber composition can be usually prepared by primarily kneading the components other than the crosslinking agent and thermally unstable components with a mixer such as a Banbury mixer, an internal mixer, a kneader, or the like, transferring the kneaded mixture into an open roll or the like, adding the crosslinking agent and the thermally unstable components thereto, and secondarily kneading the mixture. The primary kneading is performed usually at a temperature of 10 to 200° C., preferably 30 to 180° C. for 1 minute to 1 hour, preferably 1 minute to 30 minutes. The secondary kneading is performed at a temperature of usually 10 to 90° C., 20 to 60° C. for 1 minute to 1 hour, preferably 1 minute to 30 minutes.

The crosslinkable rubber composition of the present invention thus obtained has a compound Mooney viscosity (ML1+4, 100° C.) of preferably 10 to 200, more preferably 40 to 140, and still more preferably 50 to 120, and has excellent processability. The crosslinkable rubber composition of the present invention has excellent shape retention even at a compound Mooney viscosity (ML1+4, 100° C.) within the above range.

<Crosslinked Rubber>

The crosslinked rubber according to the present invention is prepared through crosslinking of the crosslinkable rubber composition according to the present invention described above.

The crosslinked rubber according to the present invention can be produced by molding the crosslinkable rubber composition according to the present invention using a molding machine corresponding to a desired shape, such as an extruder, an injection molding machine, a compressor, or a roll, causing a crosslinking reaction by heating, and fixing the shape as crosslinked product. In this case, the composition may be crosslinked after molding in advance, or may be molded and crosslinked at the same time. The molding temperature is usually 10 to 200° C., and preferably 25 to 120° C. The crosslinking temperature is usually 100 to 200° C., and preferably 130 to 190° C. The crosslinking time is usually 1 minute to 24 hours, and preferably 2 minutes to 1 hour.

The crosslinked product, although crosslinked on its surface, may be insufficiently crosslinked into its inside depending on the shape, the size, and the like. Thus, the crosslinked rubber may be secondarily crosslinked by further heating.

The heating method may be appropriately selected from general methods used to crosslink rubber, such as press heating, steam heating, oven heating, and hot air heating.

The crosslinked rubber according to the present invention thus obtained is obtained by crosslinking the crosslinkable rubber composition containing the nitrile group-containing copolymer rubber of the present invention described above, and has excellent ordinary physical properties.

For this reason, utilizing such properties, the crosslinked rubber according to the present invention can be used in broad applications. Examples thereof include a variety of sealing materials such as O-rings, packings, diaphragms, oil seals, shaft seals, bearing seals, wellhead seals, shock absorber seals, coolant seals as seals for sealing coolant solutions such as long life coolants (LLC), oil coolant seals, seals for pneumatic equipment, seals for sealing Freon, fluorohydrocarbons, or carbon dioxide used in cooling apparatuses for air conditioners and compressors for refrigerators of air-conditioning systems, seals for sealing supercritical carbon dioxide or subcritical carbon dioxide used as washing media for precision cleaning, seals for roller devices (such as roller bearings, automotive hub units, automotive water pumps, linear guide devices, and ball screws), valves and valve sheets, blow out preventers (BOPs), and bladders; a variety of gaskets such as an intake manifold gasket attached to a connection part between an intake manifold and a cylinder head, a cylinder head gasket attached to a connection between a cylinder block and a cylinder head, a rocker cover gasket attached to a connection between a rocker cover and a cylinder head, an oil pan gasket attached to a connection between an oil pan and a cylinder block or a transmission case, a gasket for fuel cell separators attached between a pair of housings which sandwich a unit cell including a positive electrode, an electrolyte plate, and a negative electrode, and a gasket for top covers for hard disk drives; a variety of rolls such as printing rolls, ironmaking rolls, papermaking rolls, industrial rolls, and office equipment rolls; a variety of belts such as flat belts (such as film core flat belts, cord flat belts, laminated flat belts, and single flat belts), V-belts (such as wrapped V-belts and low edge V-belts), V-ribbed belts (such as single V-ribbed belts, double V-ribbed belts, wrapped V-ribbed belt, rubber-backed V-ribbed belts, and top cog V-ribbed belts), CVT belts, timing belts, toothed belts, and conveyor belts; a variety of hoses such as fuel hoses, turbo air hoses, oil hoses, radiator hoses, heater hoses, water hoses, vacuum brake hoses, control hoses, air conditioner hoses, brake hoses, power steering hoses, air hoses, marine hoses, risers, and flow lines; a variety of boots such as CVJ boots, propeller shaft boots, constant-velocity joint boots, and rack and pinion boots; damping material rubber parts such as cushion materials, dynamic dampers, rubber couplings, air springs, vibration insulators, and clutch facing materials; dust covers, automotive interior members, tires, covered cables, shoe soles, electromagnetic wave shields, adhesives such as adhesives for flexible printed substrates, and fuel cell separators, as well as in the field of electronics or the like. Among these, the rubber composition can be suitably used for rolls, belts, and hoses.

EXAMPLES

The present invention will now be described more specifically by way of Examples and Comparative Examples. The term "parts" below is weight-based unless otherwise specified. The tests and the evaluations were carried out as follows.

[Monomer Composition]

The content of the acrylonitrile units in the nitrile group-containing copolymer rubber was calculated from the nitrogen content in the nitrile group-containing copolymer rubber, which was measured by the semi-micro Kjeldahl method according to JIS K6384.

[Polymerization Conversion Rate]

The total solid content was obtained by drying the polymerization reaction solution under high heat after the polymerization was terminated by adding a suitable amount of a polymerization terminator to the polymerization reaction solution in the middle of the reaction. Then, the total amount of the auxiliary materials (sodium salt of emulsifier, sodium sulfate, molecular weight adjuster, polymerization initiator, and the polymerization terminator) was subtracted from the total solid content to obtain the corrected total solid content (total solid content—auxiliary material solid content), which corresponds to the value obtained by subtracting the weight of the unreacted monomer mixture from the total weight of the monomer mixture used in the polymerization. The polymerization conversion rate was then calculated by dividing the corrected total solid content by the total weight of the monomer mixture used in the polymerization, that is, by using the calculation formula: "corrected total solid content (total solid content–polymerization auxiliary material solid content)/total weight of monomer mixture used in polymerization". Auxiliary materials other than the above-mentioned auxiliary materials were not considered in this case due to their small influence on the calculation.

[Polymer Mooney Viscosity (ML1+4, 100° C.)]

The Mooney viscosity (polymer Mooney viscosity) of the nitrile group-containing copolymer rubber was measured at 100° C. in accordance with JIS K 6300.

[Compound Mooney Viscosity (ML1+4, 100° C.)]

The Mooney viscosity (compound Mooney viscosity) of the crosslinkable rubber composition was measured at 100° C. in accordance with JIS K 6300.

[Mooney Stress-Relaxation Rate]

The Mooney stress-relaxation time of the crosslinkable rubber composition was measured at 100° C. in accordance with ISO289-1 and ISO289-4. First, according to ISO289-1, the crosslinkable rubber composition was preheated for 1 minute, then the rotor was rotated at 2 rpm, and the Mooney viscosity (ML1+4) was measured from the torque measured after 4 minutes thereafter. Thereafter, the rotation of the rotor was stopped immediately, the torque for 2 minutes after the stop of the rotor was recorded every 0.1 seconds, and the torque (in Mooney units) versus time (seconds) was plotted on a log-log graph, and the Mooney stress-relaxation rate was determined by drawing a straight line with respect to the plots and obtaining the absolute value of the slope of the straight line. The smaller the absolute value of the Mooney stress-relaxation rate, the more excellent the shape retention of the crosslinkable rubber composition.

Example 1

In a reaction vessel having an internal volume of 10 liters, 25 parts of 10% concentration of sodium dodecylbenzenesulfonate (emulsifier), 0.3 parts of sodium hydroxide, 5 parts of 10% concentration of sodium salt of naphthalenesulfonic acid formalin condensate, 0.2 parts of sodium sulfate, and 180 parts of ion-exchanged water were placed, 32 parts of acrylonitrile and 0.37 parts of t-dodecyl mercaptan (TDM) (molecular weight adjuster, trade name "Sulfole 120", manufactured by Chevron Phillips Chemical Co., Ltd.) were added thereto. After the inside gas was replaced with nitrogen three times, the reaction vessel was kept at 12° C., and 68 parts of 1,3-butadiene, a reducing agent, and a suitable amount of a chelating agent were added, and then 0.025 parts of p-menthane hydroperoxide (polymerization initiator) was placed to initiate a polymerization reaction. According to the above method, the polymerization reaction was continued while checking the polymerization conversion rate, and at the time point when the polymerization conversion rate reached 95%, 0.03 parts of 2,2,6,6-tetramethylpiperidine-1-oxyl (polymerization terminator) was added to terminate the polymerization reaction. Thereafter, the mixture was heated to 70° C., the residual monomer was recovered by steam distillation at 70° C. under reduced pressure, and 0.3 parts of an antioxidant (trade name "Irganox 1520L", manufactured by Ciba Specialty Chemicals) was added with respect to 100 parts of polymer in latex to obtain a latex of a nitrile group-containing copolymer rubber.

Next, 100 parts (in solid content) of the obtained latex of the nitrile group-containing copolymer rubber was added to and mixed with 1500 parts of a 0.2 wt % aqueous solution of calcium chloride while stirring to obtain a coagulated crumb.

Then, the obtained coagulated crumb was taken out, washed with water, and dried under reduced pressure at 50° C. for 8 hours to obtain a nitrile group-containing copolymer rubber. Using the obtained nitrile group-containing copolymer rubber, the polymer Mooney viscosity and the monomer composition were measured by the methods described above. The results are shown in Table 1.

Using a Banbury mixer, 60 parts of SRF carbon black (trade name "SEAST S", manufactured by Tokai Carbon Co., Ltd.), 1 part of stearic acid, 5 parts of zinc oxide, and 5 parts of adipic acid ether ester plasticizer (trade name "ADEKASIZER RS-107" manufactured by ADEKA) were added to and kneaded with 100 parts of the nitrile group-containing copolymer rubber. Next, the mixture was transferred to a roll, and 1.5 parts of powdered sulfur (325 mesh) and 2 parts of dibenzothiazyl disulfide (trade name "Noxeller DM", manufactured by Ouchi Shinko Chemical Co., Ltd.) were added and kneaded to prepare a crosslinkable rubber composition.

Then, using the obtained crosslinkable rubber composition, the compound Mooney viscosity and the Mooney stress-relaxation rate were measured by the methods described above. The results are shown in Table 1.

[Measurement of Polymer Mooney Viscosity at Polymerization Conversion Rate of 60%]

A nitrile group-containing copolymer rubber was obtained in the same manner as in Example 1 except that 2,2,6,6-tetramethylpiperidine-1-oxyl (polymerization terminator) was added to terminate the polymerization reaction at the time point when the polymerization conversion rate reached 60%. With respect to the obtained nitrile group-containing copolymer rubber, the polymer Mooney viscosity at the polymerization conversion rate of 60% was measured by the method described above. The results are shown in Table 1.

Example 2

A nitrile group-containing copolymer rubber was obtained in the same manner as in Example 1 except that the amount of t-dodecyl mercaptan (TDM) used was changed to 0.34 parts, and a crosslinkable rubber composition was prepared using the obtained nitrile group-containing copolymer rubber, and the evaluations were made in the same manner. The results are shown in Table 1.

Example 3

A nitrile group-containing copolymer rubber was obtained in the same manner as in Example 1 except that the amount of t-dodecyl mercaptan (TDM) used was changed to 0.31 parts, and a crosslinkable rubber composition was prepared using the obtained nitrile group-containing copolymer rubber, and the evaluations were made in the same manner. The results are shown in Table 1.

Comparative Example 1

A nitrile group-containing copolymer rubber was obtained in the same manner as in Example 3 except that 2,2,6,6-tetramethylpiperidine-1-oxyl (polymerization terminator) was added to terminate the polymerization reaction at the time point when the polymerization conversion rate reached 80%, and a crosslinkable rubber composition was prepared using the obtained nitrile group-containing copolymer rubber, and the evaluations were made in the same manner. The results are shown in Table 1.

Comparative Example 2

A nitrile group-containing copolymer rubber was obtained in the same manner as in Example 2 except the amount of t-dodecyl mercaptan (TDM) used at the start of polymerization was set to 0.27 parts, 0.07 parts of t-dodecyl mercaptan (TDM) was added at the time point when the polymerization conversion rate reached 65%, and a crosslinkable rubber composition was prepared using the obtained nitrile group-containing copolymer rubber, and the evaluations were made in the same manner. The results are shown in Table 1.

Comparative Example 3

A nitrile group-containing copolymer rubber was obtained in the same manner as in Example 1 except that the amount of t-dodecyl mercaptan (TDM) used was changed to 0.25 parts, and a crosslinkable rubber composition was prepared using the obtained nitrile group-containing copolymer rubber, and the evaluations were made in the same manner. The results are shown in Table 1.

Comparative Example 4

A nitrile group-containing copolymer rubber was obtained in the same manner as in Example 1 except the amount of t-dodecyl mercaptan (TDM) used at the start of polymerization was set to 0.27 parts, 0.07 parts of t-dodecyl mercaptan (TDM) was added at the time point when the polymerization conversion rate reached 50%, and a crosslinkable rubber composition was prepared using the obtained nitrile group-containing copolymer rubber, and the evaluations were made in the same manner. The results are shown in Table 1.

Comparative Example 5

A nitrile group-containing copolymer rubber was obtained in the same manner as in Example 1 except the amount of t-dodecyl mercaptan (TDM) used at the start of polymerization was set to 0.25 parts, 0.10 parts of t-dodecyl mercaptan (TDM) was added at the time point when the polymerization conversion rate reached 50%, and a crosslinkable rubber composition was prepared using the obtained nitrile group-containing copolymer rubber, and the evaluations were made in the same manner. The results are shown in Table 1.

Comparative Example 6

A nitrile group-containing copolymer rubber was obtained in the same manner as in Example 1 except that the amount of acrylonitrile used was changed to 37 parts, the amount of 1,3-butadiene used was changed to 63 parts, and the amount of t-dodecyl mercaptan (TDM) used was changed to 0.40 parts, respectively, and a crosslinkable rubber composition was prepared using the obtained nitrile group-containing copolymer rubber, and the evaluations were made in the same manner. The results are shown in Table 1.

Comparative Example 7

A nitrile group-containing copolymer rubber was obtained in the same manner as in Example 1 except that the amount of acrylonitrile used was changed to 37 parts, the amount of 1,3-butadiene used was changed to 63 parts, and the amount of t-dodecyl mercaptan (TDM) used was changed to 0.43 parts, respectively, and a crosslinkable rubber composition was prepared using the obtained nitrile group-containing copolymer rubber, and the evaluations were made in the same manner. The results are shown in Table 1.

TABLE 1

| | | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Monomers used in polymerization | | | | | | | | | | | |
| Acrylonitrile | (parts) | 32 | 32 | 32 | 32 | 32 | 32 | 32 | 32 | 37 | 37 |
| 1,3-Butadiene | (parts) | 68 | 68 | 68 | 68 | 68 | 68 | 68 | 68 | 63 | 63 |
| Amounts of molecular weight adjusters used in polymerization | | | | | | | | | | | |
| Time point when polymerization starts | (parts) | 0.37 | 0.34 | 0.31 | 0.31 | 0.27 | 0.25 | 0.27 | 0.25 | 0.40 | 0.43 |
| Time point when polymerization conversion rate is 50% | (parts) | 0 | 0 | 0 | 0 | 0 | 0 | 0.07 | 0.10 | 0 | 0 |
| Time point when polymerization conversion rate is 65% | (parts) | 0 | 0 | 0 | 0 | 0.07 | 0 | 0 | 0 | 0 | 0 |
| Polymer Mooney viscosity (ML1 + 4, 100° C.) at polymerization conversion rate of 60% | | 35 | 45 | 55 | 55 | 70 | 75 | 65 | 70 | 30 | 25 |
| Final polymer Mooney viscosity (ML1 + 4, 100° C.) | | 90 | 90 | 115 | 75 | 90 | 125 | 90 | 90 | 75 | 80 |
| Final polymerization conversion rate | (%) | 95 | 90 | 90 | 80 | 90 | 90 | 90 | 90 | 90 | 95 |
| Monomer composition of nitrile group-containing copolymer rubber | | | | | | | | | | | |
| Acrylonitrile units | (wt %) | 33.5 | 34 | 34 | 34.5 | 34 | 34 | 34 | 34 | 36 | 36 |
| 1,3-Butadiene units | (wt %) | 66.5 | 66 | 66 | 65.5 | 66 | 66 | 66 | 66 | 64 | 64 |
| Evaluation of crosslinkable rubber composition | | | | | | | | | | | |
| Compound Mooney viscosity (ML1 + 4, 100° C.) | | 85 | 85 | 105 | 70 | 85 | 115 | 85 | 85 | 70 | 75 |
| Mooney stress-relaxation rate | | 0.360 | 0.350 | 0.380 | 0.410 | 0.420 | 0.410 | 0.410 | 0.410 | 0.405 | 0.400 |

Referring to Table 1, in a case where the copolymer had a Mooney viscosity (ML1+4, 100° C.) in the range of 30 to 60 at the time point when the polymerization conversion rate was 60%, the copolymerization was carried out until the polymerization conversion rate reached 85% or more, and the obtained nitrile group-containing copolymer rubber had a final polymer Mooney viscosity of 85 to 150, the crosslinkable rubber composition had a low Mooney stress-relaxation rate and excellent shape retention (Examples 1 to 3).

On the other hand, in a case where the final polymer Mooney viscosity was less than 85, the crosslinkable rubber composition had a high Mooney stress-relaxation rate and poor shape retention (Comparative Examples 1, 6, and 7).

Also, in a case where the polymer Mooney viscosity at the time point when the polymerization conversion rate was 60% was more than 60, the Mooney stress-relaxation rate was high and the shape retention was poor (Comparative Examples 2 to 5).

The invention claimed is:
1. A method comprising:
 copolymerizing a monomer mixture consisting of an α,β-ethylenically unsaturated nitrile monomer and a conjugated diene monomer,
 wherein
  a method for the copolymerization is an emulsion polymerization method, and a temperature of the emulsion polymerization is 5 to 30° C.,
  in the copolymerization, a polymerization initiator is added in an amount of 0.05 parts by weight or less relative to 100 parts by weight of the monomer mixture used in the copolymerization, a molecular weight adjuster is added at the start of the copolymerization in an amount of 0.29 to 0.5 parts by weight relative to 100 parts by weight of the monomer mixture, and a molecular weight adjuster is not added thereafter, the copolymer has a Mooney viscosity (ML1+4, 100° C.) in a range of 30 to 60 at a time point when a polymerization conversion rate is 60%, the copolymerization is carried out until the polymerization conversion rate reaches 85% or more to obtain a nitrile group-containing copolymer rubber, and the obtained nitrile group-containing copolymer rubber has a Mooney viscosity (ML1+4, 100° C.) of 85 to 150.

2. The method according to claim 1, further comprising:
hydrogenating at least some of carbon-carbon unsaturated bonds of the obtained nitrile group-containing copolymer rubber to form a hydrogenated nitrile group-containing copolymer rubber.

3. The A-method according to claim 1, further comprising:
adding a crosslinking agent to the obtained nitrile group-containing copolymer rubber to form a crosslinkable rubber composition.

4. The A-method according to claim 3, further comprising:
crosslinking the crosslinkable rubber composition.

* * * * *